(12) United States Patent
Guillemette

(10) Patent No.: US 8,424,893 B2
(45) Date of Patent: Apr. 23, 2013

(54) SHOCK ABSORPTION SYSTEM FOR BICYCLE FRAME AND COMPONENTS

(75) Inventor: Marcel Guillemette, St-Romuald (CA)

(73) Assignee: Brevets Futek-MSM LTEE, Lévis (Québec) (CA)

( * ) Notice: Subject to any disclaimer, the term of this patent is extended or adjusted under 35 U.S.C. 154(b) by 0 days.

(21) Appl. No.: 12/805,222

(22) Filed: Jul. 19, 2010

(65) Prior Publication Data

US 2012/0013100 A1    Jan. 19, 2012

(51) Int. Cl.
*B62K 19/00* (2006.01)

(52) U.S. Cl.
USPC ............ 280/283; 74/594.1; 74/551.2

(58) Field of Classification Search ........... 280/283; 267/36.1; 297/215; 74/594.1, 551.2
See application file for complete search history.

(56) References Cited

U.S. PATENT DOCUMENTS

| 2,107,251 | A |   | 2/1938 | Peace |
| 5,405,159 | A |   | 4/1995 | Klein et al. |
| 5,865,456 | A | * | 2/1999 | Busby et al. .......... 280/284 |
| 6,450,520 | B1 |  | 9/2002 | Girard |
| 6,783,142 | B1 |  | 8/2004 | Schober |
| 7,104,532 | B1 |  | 9/2006 | Johnson et al. |

* cited by examiner

*Primary Examiner* — Tony H. Winner
*Assistant Examiner* — Jacob Knutson
(74) *Attorney, Agent, or Firm* — Jacobson Holman PLLC

(57) ABSTRACT

A shock absorption system for a bicycle that is simple, flexible and compatible with the many sections of a bicycle where adequate shock absorption is sought. The shock absorption properties are provided through a C-shaped compliant structure. C-shaped compliant structure may be removable such that it may be installed and removed as per the desire of the end user of the bicycle for post market modification and personalization purposes.

20 Claims, 6 Drawing Sheets

SHOCK ABSORPTION SYSTEM FOR BICYCLE FRAME AND COMPONENTS

FIELD OF THE INVENTION

The present invention relates to bicycles; more specifically, to a shock absorption system for a bicycle frame or components.

BACKGROUND OF THE INVENTION

The use of shock absorption systems, such as suspensions, for bicycles is well known in the art. Generally, these suspensions for bicycles consist of springs or other systems that confer flexibility between two components of the bicycle, thus absorbing the many forces that the bicycle frame or components may be subjected to. Several of these systems include springs or other flexible materials and over the years have been known to involve hydraulic mechanisms or complex moving parts. Examples of such systems, found on a variety of locations on a bicycle, include the following:

U.S. Pat. No. 6,450,520 discloses a bicycle rear suspension for mountain bikes that comprises a link that pivotally mounted at opposite ends to a portion of a main bicycle frame and to a low front portion of a bicycle swingarm. This link allows for a displacement between the frame and the swingarm, between two degrees of freedom: for displacements in an area defined by the position of the two pivots relative to a rear wheel axle and by the deformation of a spring between the frame and the swingarm. As well, a leaf spring is optionally used within the shock absorber system having a damper to limit relative displacements between the frame and the swingarm upon impact of the rear wheel with an obstacle.

U.S. Pat. No. 5,405,159 discloses a bicycle suspension comprising a rotary damper as well as composite springs. The springs control the direction of allowable movement in the suspension system to account for rocking, twisting and unwanted lateral deflections.

U.S. Pat. No. 6,783,142 discloses a bicycle rear suspension mechanism comprising a parabolic swing arm mounted such that the axis of rotation of the rear wheel is in alignment with the central axis of the parabolic shape. A flexor element is formed on the inside of the perimeter of the parabolic swing arm, below the central axis of the parabolic shape and below and forwardly of the rear wheel axle. As well, a shock absorber can connect to the upper rocker arm to dampen the suspension mechanism. As such, stored energy in the flexor element is released and directs the force offset by a moment arm from the axis of rotation of the rear wheel in order to contribute to the forward momentum of the bicycle.

U.S. Pat. No. 7,104,532 discloses a shock absorbing assembly for a bicycle seat. The shock absorber involves a shaft that attaches to the bicycle frame and a contoured flat spring where one end is attached to the shaft, a support member having a first end attached to the spring and a second end attached to the bicycle seat. The assembly also includes a flexible strap having a first end and a second end where the first end is connected to one end of the spring and the second end is attached to the spring's other end. A second flexible strap which has a first end and a second end is also connected to the shaft and the support member.

The suspensions discussed above involve complex moving parts and it is desirable to have a suspension system for a bicycle that is simple, easy to maintain and is compatible with the various sections of a bicycle that may need absorption of vibrations or shock.

SUMMARY OF THE INVENTION

In accordance with the abovementioned need, it is an object of the present invention to provide a shock absorption system for a bicycle that is simple, flexible and compatible with the many sections of a bicycle where adequate shock absorption is sought. The shock absorption properties are provided through a C-shaped compliant structure.

Another important feature of the invention is for the C-shaped compliant structure to be removable such that it may be installed and removed as per the desire of the end user of the bicycle as post market modification and personalisation is an important facet of the bicycle market.

Accordingly, the object of the present invention provides a shock absorption system for a bicycle comprising:

a compressible C-shaped compliant structure for linking a longitudinal component to a second component, the C-shaped compliant structure comprising:
a first end proximate a first tip of the C-shaped compliant structure;
a second end proximate a second tip of the C-shaped compliant structure opposite said first tip;
a first portion at a first offset distance from said first end;
a second portion opposite said first portion at a second offset distance from said second end;
a first attachment member operably connected to the longitudinal component at a selected one of the first portion or the first end;
a second attachment member operably connected to the second component at a selected one of the second portion or the second end;
wherein attachment of the first attachment member to the longitudinal component and attachment of the second attachment member to the second component, allows for flexibility between the components upon compression of the C-shaped compliant structure and wherein the first attachment member and the second attachment member are substantially centrally traversed by a longitudinal axis defined by and parallel to the longitudinal component.

BRIEF DESCRIPTION OF THE DRAWINGS

These and other objects and advantages of the invention will become apparent upon reading the detailed description and upon referring to the drawings in which.

PREFERRED EMBODIMENTS OF THE PRESENT INVENTION

Figure 1:
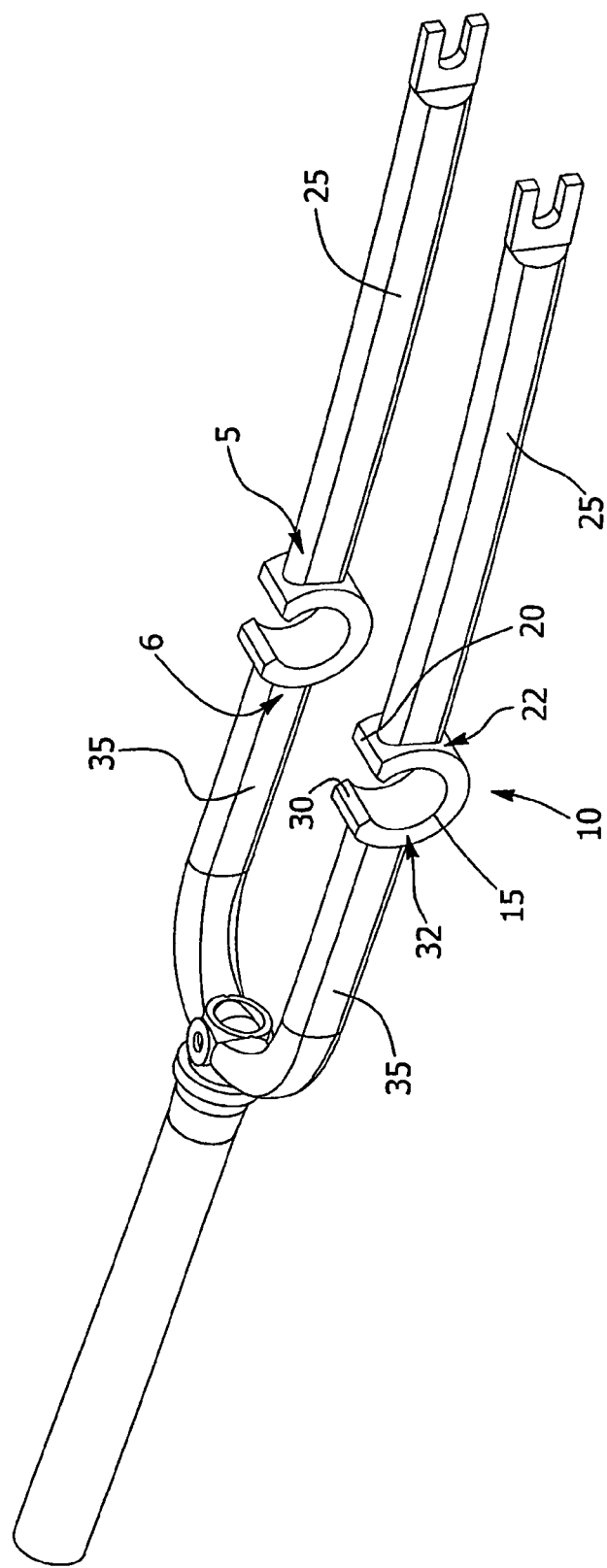
FIG. 1 is a side perspective view of the shock absorption system according to a preferred embodiment of the present invention as installed on the front fork of a bicycle.
Figure 2:
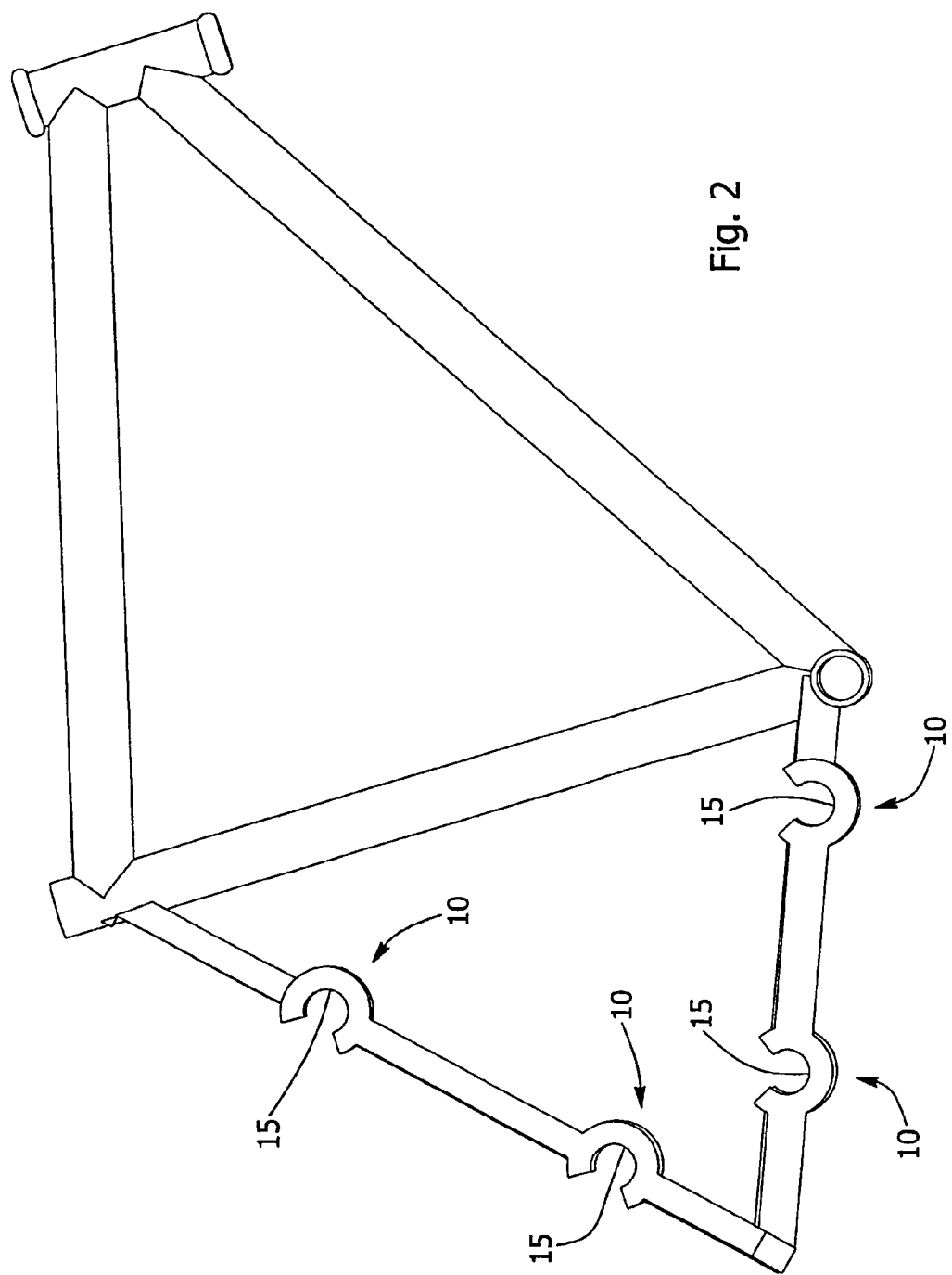
FIG. 2 is a side view of a shock absorption system according to another preferred embodiment of the present invention wherein the shock absorption system is inserted into many locations of the frame of a bicycle.

As shown in FIG. 1, the present invention relates to a shock absorption system (10) for a bicycle. This shock absorption system involves a compressible C-shaped compliant structure (15) that links a longitudinal component (25) of the bicycle to a second component (35).

As shown in FIGS. 1 to 6, the longitudinal component (25) of the bicycle can include such frame elements as tubes, crowns, bars, stems and blades.

FIGS. 1 to 6 also show that the C-shaped compliant structure has a first end (20) and a second end (30). The first end (20) is proximate a first tip of the C-shaped compliant structure (15) and the second end (30) is proximate a second tip of the C-shaped compliant structure opposite the first tip.

As it can also be seen from FIGS. 1 to 6, the C-shaped compliant structure (15) comprises a first portion (22) at one side of the C shape and a second portion (32) at the other side of the C shape. The first portion (22) is at a first offset distance from the first end (20). The second portion (32) is opposite the first portion (22) at a second offset distance from the second end (30).

Furthermore, a first attachment member (5) of the C-shaped compliant structure (15) is operably connected to the longitudinal component (25) at either of a selected first portion (22) or first end (20). A second attachment member (6) is also operably connected to the second component at a selected one of the second portion (32) or the second end (30). Examples of where the attachment member is connected to either the first or second end can be seen in FIG. 6.

Attachment of the first attachment member (5) to the longitudinal component (25) and attachment of the second attachment member (6) to the second component, confers flexibility between the components upon compression of the C-shaped compliant structure (15).

The C-shaped compliant structure (15) is rigid and flexible such that it is able to yield and compress upon the application of force and enable movement of the first and second portions towards each other, while being able to bring both portions back to their original unbiased condition as soon as the application of force is removed.

It is to be understood that the size, shape and aperture size of the C-shaped compliant structure can vary depending on the application and the preference of the end user. For example, The C-shaped compliant structure may be larger in size when used in connection with components comprising a front fork than with elements comprising the seat of the bicycle.

It can also be seen by FIGS. 1 to 6 that the first attachment member (5) and the second attachment member (6) are centrally traversed by a same longitudinal axis defined by and parallel to the longitudinal component (25).

As it can be appreciated, the C-shaped compliant structure (15) can be relatively closed or can be more open. It can also be appreciated that the composition of the C-shaped compliant structure in the case where it is more open will be such that it will compensate to increase the stiffness of the structure through the addition of composition material. As well, the C-shaped compliant structure (15) can be made less stiff by removing material in the C-shape structure. Therefore, this C-shaped compliant structure can be adapted, and is adaptable, to the needs of the end user.

Figure 5:
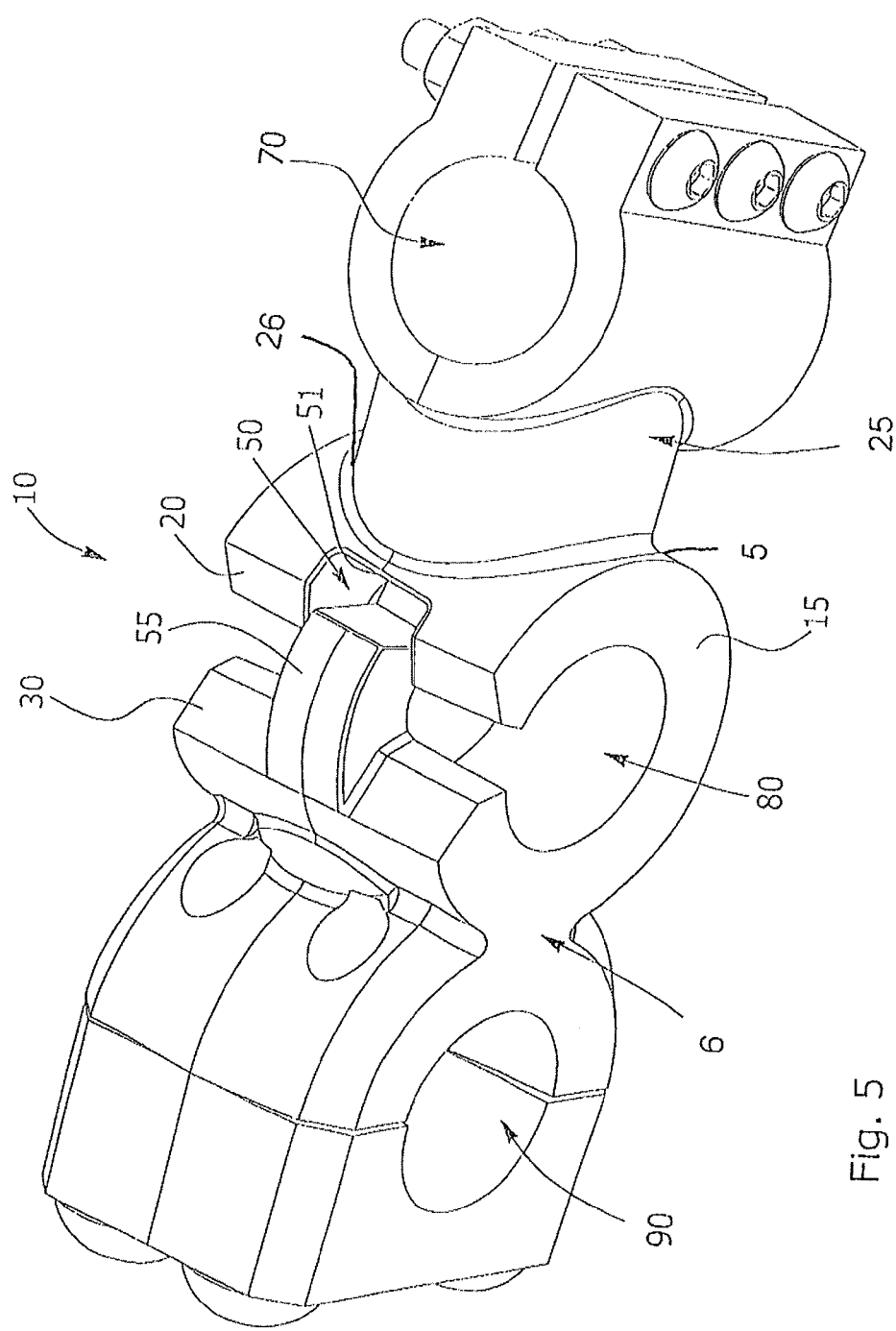
FIG. 5 is a perspective side view of a shock absorption system according to another preferred embodiment of the present invention, wherein the system is designed for two longitudinal components and is removable.

FIG. 5 shows an alternate embodiment of the present invention where the C-shaped compliant structure (15) is adapted to prevent torsion. More specifically, the C-shaped compliant structure further comprises a notch (50) defining a space at the first (20) or the second end (30) of the C shaped compliant structure (15) and a tab (55) at the corresponding opposite end. The tab (55) has a projection extending into the space defined by the notch (50). The tab (55) limits torsion of the C-shaped compliant structure (15). The notch (50) comprises a seat surface (51) for limiting displacement of the tab (55) into the notch (50) upon compression of the C-shaped compliant structure (15).

Figure 4:
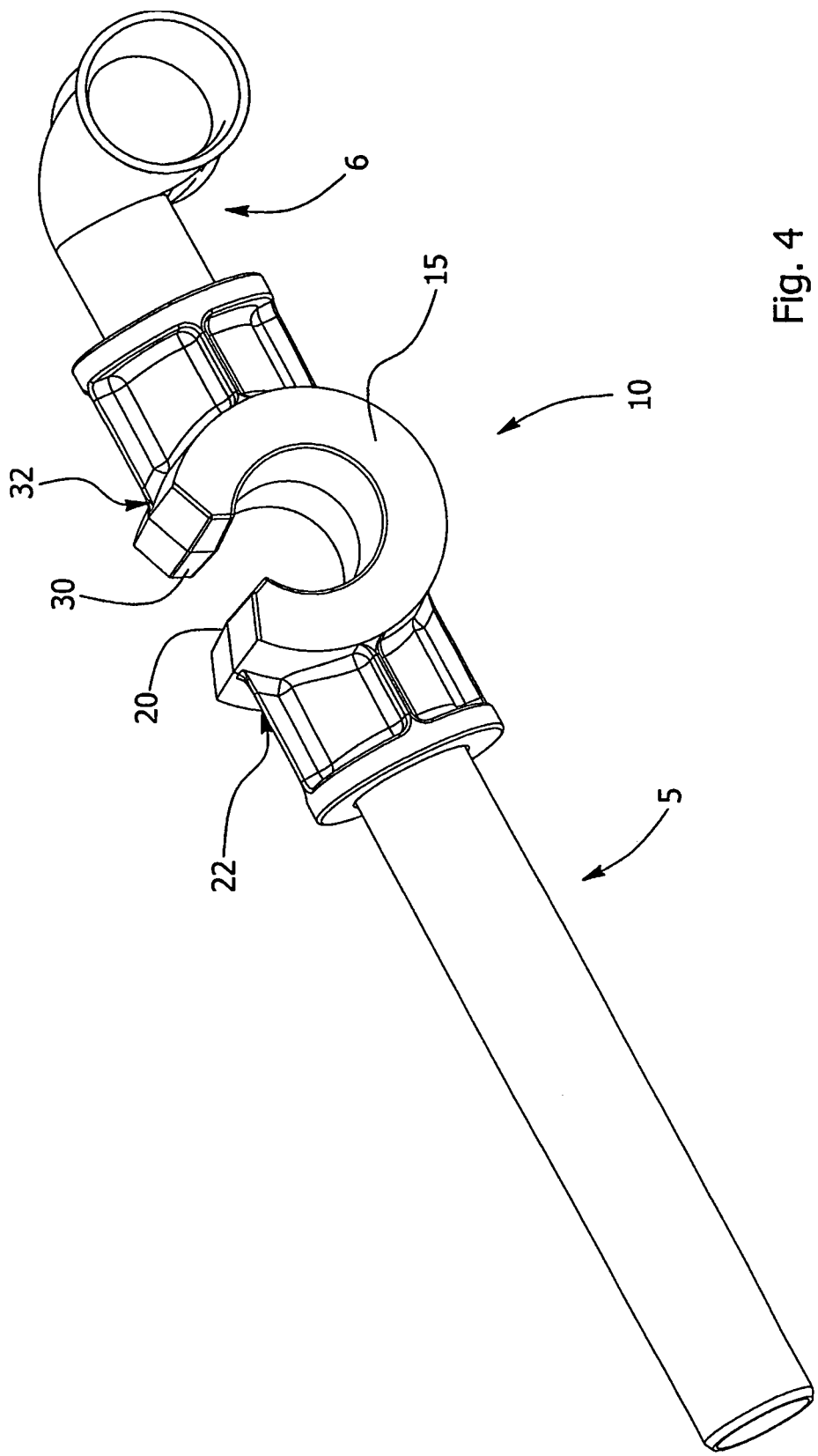
FIG. 4 is a perspective view of a shock absorption system according to another preferred embodiment of the present invention, used between two longitudinal components.
Figure 6:
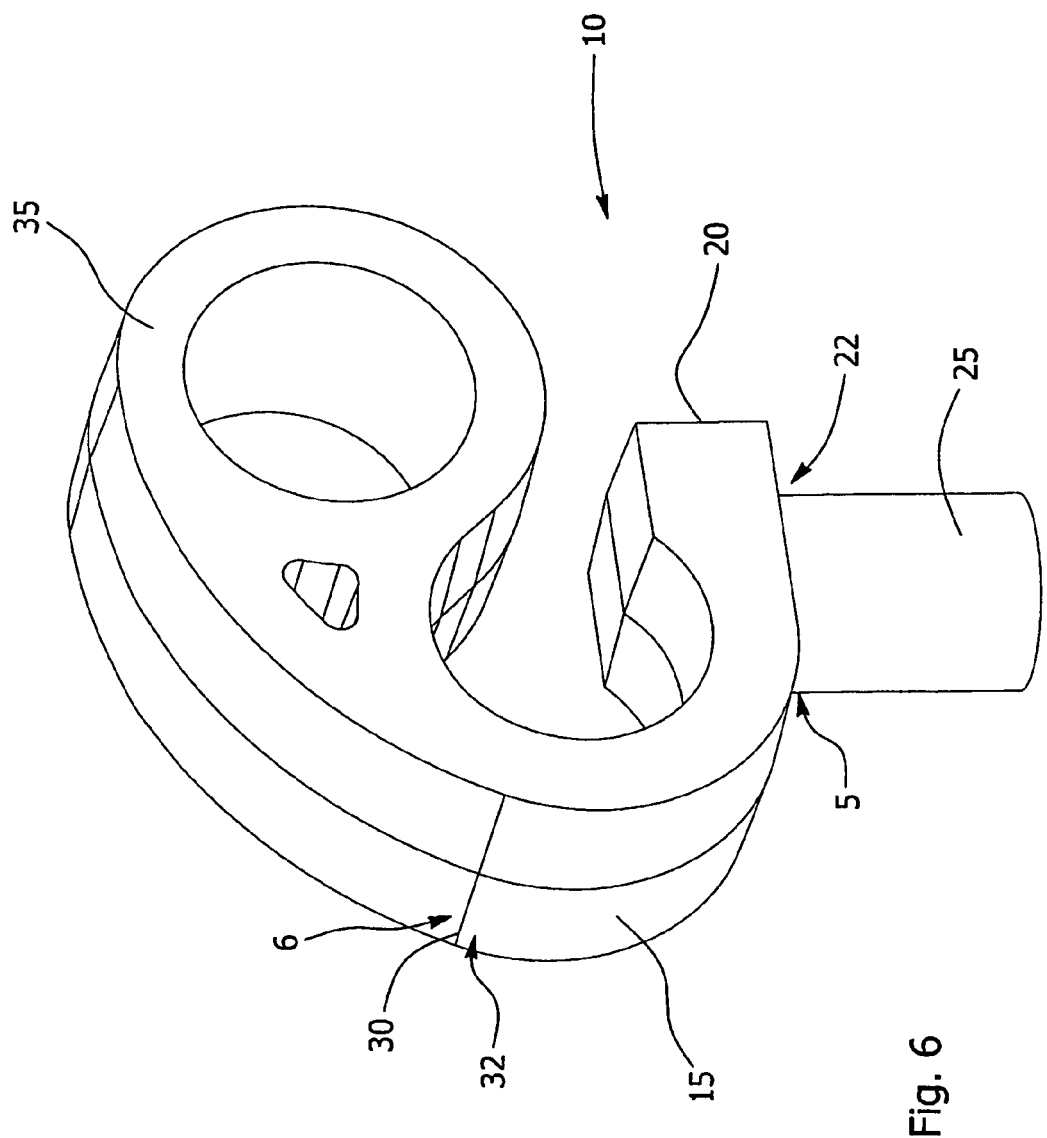
FIG. 6 is a perspective view of a shock absorption system according to another preferred embodiment of the present invention.

Alternatively, as shown is FIGS. 4, 5 and 6, the first (5) and second (6) attachment members of the C-shaped compliant structure include linkage systems for removably linking the first attachment member to the longitudinal component (25) and the second attachment member to the second component. In FIG. 5, linkage system (26) is used to link the first attachment member 5 to the longitudinal component (25). Linkage systems allow for the C-shaped compliant structure to be added and removed as needed by the end user to a plurality of bicycle frame components or accessories. In other embodiments of the present invention, the C-shaped compliant structure may be integrally formed during manufacturing of the bicycle frame component or accessory.

Figure 3:
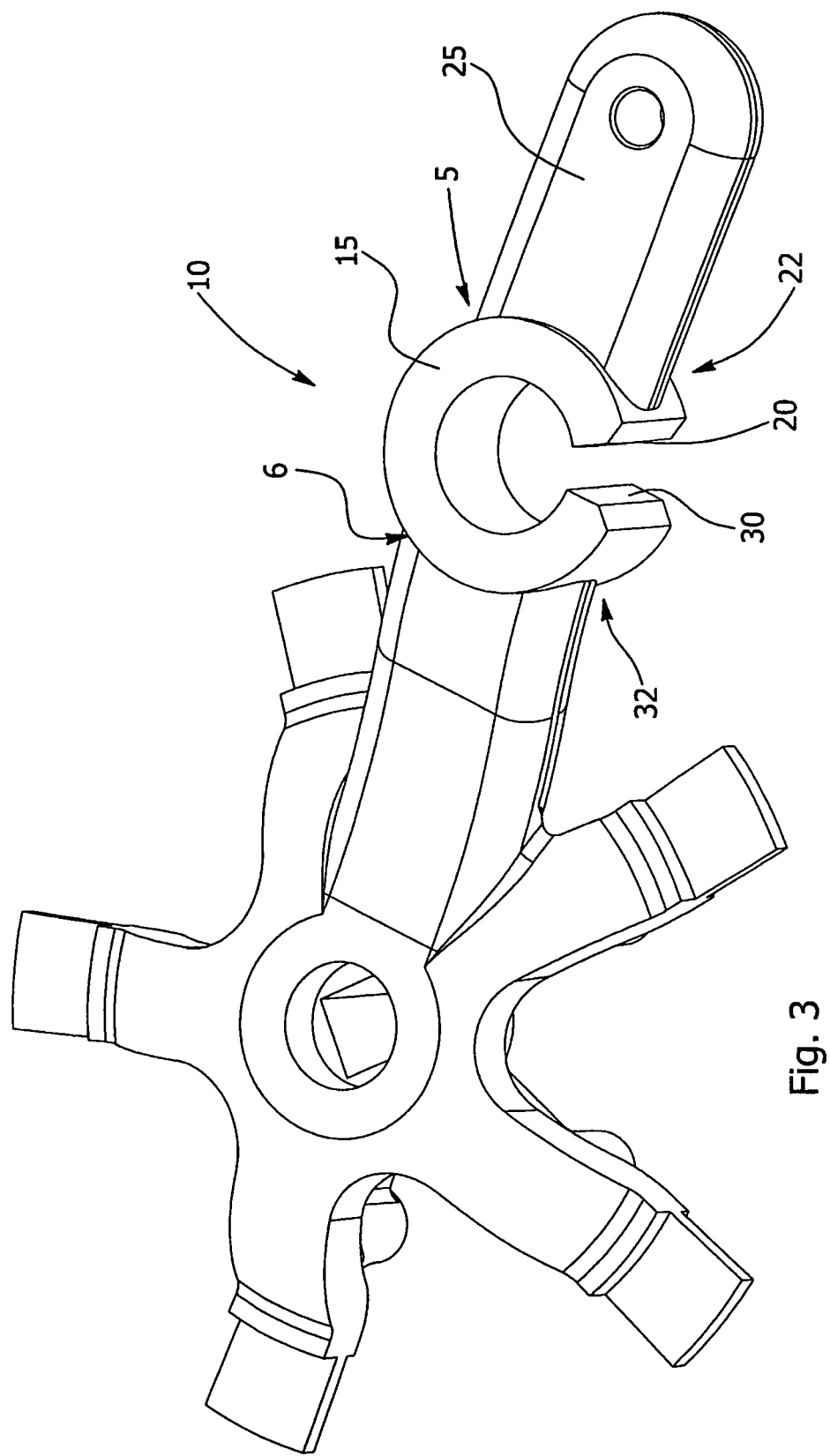
FIG. 3 is a side view of a shock absorption system according to another preferred embodiment of the present invention wherein the shock absorption system is inserted into the crank of a bicycle.

In addition to the above, as shown in FIGS. 1 to 6, the second component linked to the C-shaped compliant structure (15) can be a second longitudinal component, but it can also be a component of any other shape. This allows for two longitudinal components to be linked one to the other through the C-shaped compliant structure in order to confer flexibility between these components. For example, a C-shaped compliant structure (15) can link two tubes forming one prong of a fork of a bicycle. As well, the C-shaped compliant structure (15) can link two bars forming the crank or a crank assembly pedal arm (FIG. 3). In addition, the C-shaped compliant structure (15) can be linked between the tubular components of a seatstay or a chainstay of the bicycle.

When the C-shaped compliant structure is used for crank applications, in addition to the shock absorption properties, the C-shaped compliant structure also provides an additional propulsive impulse during the cyclical movement of the crank. More specifically, during an initial phase of the crank cyclical trajectory, the C-shaped compliant structure is compressed under an initial propulsive force from the pedal. In a subsequent phase of the crank cyclical trajectory, the initial propulsive force from the pedal is released and the C-shaped compliant structure expands from its contracted state, thus transmitting additional propulsive power to the chain and wheel for facilitating displacement of the bicycle.

In addition, as shown in FIG. 4, the C-shaped compliant structure is adaptable to link the longitudinal components (25) that comprise the handlebar stem, stem or head tube of a bicycle.

With respect to a removable C-shaped compliant structure (15), FIGS. 4 and 6 shows another embodiment of the present invention where the second attachment member (6) of the C-shaped compliant structure defines an aperture wherein a center axis of said aperture is perpendicular to the longitudinal component (25). This way, upon linking the longitudinal component (25) to the second component, the second component is perpendicular lengthwise to an end of the longitudinal component (25). This embodiment allows to link two components that are perpendicular to one another, for example, like the handlebars to the handlebar stem or the seat to the frame.

Alternatively, as shown in FIG. 5, the first attachment member (5) of the C-shaped compliant structure can comprise a first aperture (70) which defines a first center axis. This center axis is perpendicular to a center axis defined by the aperture (80) formed by the C-shaped compliant structure.

The second attachment member (6) of the C-shaped compliant structure also has a second aperture (90) which defines a second center axis that is parallel to the center axis of the aperture of the C-shaped compliant structure.

One may appreciate that the C-shaped compliant structure of the present invention discussed above can be made of flexible, resistant materials such as hard plastics and rubbers.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A shock absorption system for a bicycle comprising:
a compressible C-shaped compliant structure for linking a longitudinal component to a second component, the C-shaped compliant structure having a concave portion defining an inner space and comprising:
  a first end proximate a first tip of the C-shaped compliant structure;
  a second end proximate a second tip of the C-shaped compliant structure opposite said first tip;
  a first portion at a first offset distance from said first end;
  a second portion opposite said first portion at a second offset distance from said second end;
  a first attachment member operably connected to the longitudinal component at a selected one of the first portion or the first end;
  a second attachment member operably connected to the second component at a selected one of the second portion or the second end;
wherein attachment of the first attachment member to the longitudinal component and attachment of the second attachment member to the second component, allows for flexibility between the components upon compression of the C-shaped compliant structure, wherein the first attachment member and the second attachment member are substantially centrally traversed by a longitudinal axis defined by and parallel to the longitudinal component, and wherein a central axis of the longitudinal component traverses the inner space of the C-shaped compliant structure.

2. The system of claim 1, wherein the C-shaped compliant structure further comprises a notch defining a notch space at a selected one of the first or second end and a tab at an end opposite the selected first or second end, such that the tab has a projection extending into the notch space, wherein the tab limits torsion of the C-shaped compliant structure, and wherein the notch comprises a seat surface for limiting displacement of the tab into the notch upon compression of the C-shaped compliant structure.

3. The system of claim 2, wherein the first and second attachment members of the C-shaped compliant structure comprise linkage systems for removably incorporating the first attachment member to the longitudinal component and the second attachment member to the second component.

4. The system of claim 3, wherein the C-shaped compliant structure, the longitudinal component and the second component form a front fork of the bicycle.

5. The system of claim 3, wherein the C-shaped compliant structure, the longitudinal component and the second component form a crank of the bicycle.

6. The system of claim 3, wherein the longitudinal component comprises a handlebar stem of a front of a bicycle frame.

7. The system of claim 3, wherein:
the second attachment member of the C-shaped compliant structure defines an aperture wherein a center axis of said aperture is perpendicular to the longitudinal component and upon linking the longitudinal component to the second component, the second component is perpendicular lengthwise with respect to the longitudinal component.

8. The system of claim 2, wherein the C-shaped compliant structure, the longitudinal component and the second component form a seatstay of the bicycle.

9. The system of claim 2, wherein the C-shaped compliant structure, the longitudinal component and the second component form a chainstay of the bicycle.

10. The system of claim 2, wherein the first attachment member of the C-shaped compliant structure includes a first aperture having a first center axis perpendicular to a center axis of an aperture of the C-shaped compliant structure, and wherein the second attachment member of the C-shaped compliant structure includes a second aperture having a second center axis parallel to the center axis of the aperture of the C-shaped compliant structure.

11. The system of claim 1, wherein the first and second attachment members of the C-shaped compliant structure comprise linkage systems for removably incorporating the first attachment member to the longitudinal component and the second attachment member to the second component.

12. The system of claim 1, wherein the second component is a second longitudinal component.

13. The system of claim 1, wherein the C-shaped compliant structure, the longitudinal component and the second component form a front fork of the bicycle.

14. The system of claim 1, wherein the C-shaped compliant structure, the longitudinal component and the second component form a seatstay of the bicycle.

15. The system of claim 1, wherein the C-shaped compliant structure, the longitudinal component and the second component form a chainstay of the bicycle.

16. The system of claim 1, wherein the C-shaped compliant structure, the longitudinal component and the second component form a crank of the bicycle.

17. The system of claim 1, wherein the longitudinal component comprises a handlebar stem of a front of a bicycle frame.

18. The system of claim 1, wherein:
the second attachment member of the C-shaped compliant structure defines an aperture wherein a center axis of said aperture is perpendicular to the longitudinal component and upon linking the longitudinal component to the second component, the second component is perpendicular lengthwise with respect to the longitudinal component.

19. The system of claim 1, wherein the first attachment member of the C-shaped compliant structure includes a first aperture having a first center axis perpendicular to a center axis of an aperture of the C-shaped compliant structure, and wherein the second attachment member of the C-shaped compliant structure includes a second aperture having a second center axis parallel to the center axis of the aperture of the C-shaped compliant structure.

20. The system of claim 1, wherein the second component is a second longitudinal component.

* * * * *